United States Patent

[11] 3,616,907

| [72] | Inventor | Robert D. Van Vleet<br>931 Willsie, Rapid City, S. Dak. 57701 |
|---|---|---|
| [21] | Appl. No. | 17,469 |
| [22] | Filed | Mar. 9, 1970 |
| [45] | Patented | Nov. 2, 1971 |

[54] DEEP FRY OIL-FILTERING UNIT METHOD AND APPARATUS
6 Claims, 3 Drawing Figs.

[52] U.S. Cl. .................................................. 210/65,
                                    99/408, 210/167, 210/DIG. 8
[51] Int. Cl. ........................................................ B01d 37/00
[50] Field of Search ............................................. 210/167,
                     406, 416, 445, 460, 457, DIG. 8, 65, 94; 99/408

[56] References Cited
UNITED STATES PATENTS

| 1,506,652 | 8/1924 | Maher | 210/459 X |
| 2,760,641 | 8/1956 | Mies, Jr. | 210/94 |
| 3,159,095 | 12/1964 | Wagner | 210/167 |

Primary Examiner—Reuben Friedman
Assistant Examiner—T. A. Granger
Attorney—Merchant & Gould ABSTRACT: A holding tank having one end of a length of flexible tubing connected to a hot oil port with the other end connected to the inlet of a filter housing or positionable in communication with the hot oil in a deep frying unit, and an air pump having an air inlet and an air outlet with a length of flexible conduit connected between one of said inlet and said outlet and an airport in the holding tank. The entire filtering unit further being mounted in a wheeled housing for storage and easy access to any deep fryer.

PATENTED NOV 2 1971  3,616,907

INVENTOR.
ROBERT D. VAN VLEET
BY
Merchant & Gould
ATTORNEYS

DEEP FRY OIL-FILTERING UNIT METHOD AND APPARATUS

BACKGROUND OF THE INVENTION

Field of the Invention

In the use of deep fryers and the like, and especially in commercial establishments, it is necessary to periodically remove the oil from the fryer and clean the fryer. In many commercial establishments the oil is used so frequently that it is necessary to clean the fryer many times before it is actually necessary to change the oil. Further, if foreign particles are removed from the oil periodically, it is not necessary to change the oil as frequently.

Description of the Prior Art

In the prior art, many deep fryers and supplied with devices for periodically removing and filtering the oil. Because these devices are incorporated in the deep fryer, the expense of the deep fryer is greatly increased and, further, if a deep fryer without these devices incorporated therein is already being utilized, there is no way to drain and clean the same.

SUMMARY OF THE INVENTION

The present invention pertains to a deep fry oil filtering unit method and apparatus including a hot oil holding tank, filtering means and an air pump with first conduit means connectable between a hot oil port in the holding tank and an inlet of the filtering means or the oil containing compartment in a deep frying unit and a second conduit connectable between an air port in the holding tank and an inlet or an outlet of an air pump to produce subatmospheric pressure or pressure greater than atmospheric within the holding tank.

It is an object of the present invention to provide an improved deep fry oil filtering unit.

It is further object of the present invention to provide a portable filtering unit which is conveniently storable and quickly and easily connectable for removing and filtering oil from a deep frying unit.

It is a further object of the present invention to provide a deep fry oil-filtering unit which is simple to manufacture and maintain.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the FIGS.

DESCRIPTION OF THE PREFERRED EMBODIMENT

Figure 1:
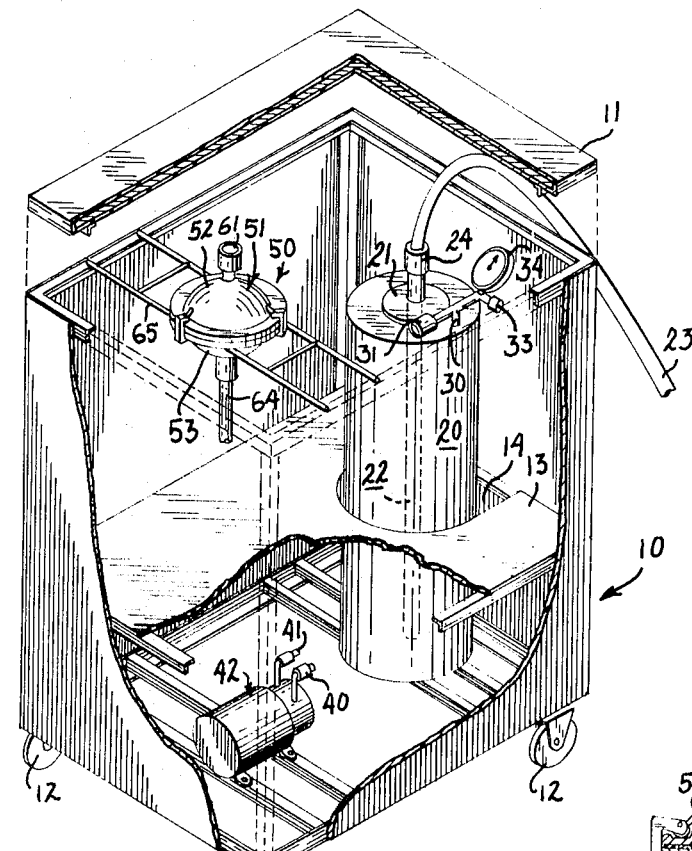
FIG. 1 is a view in perspective of the present unit, portions thereof broken away and shown in section.
Figure 2:
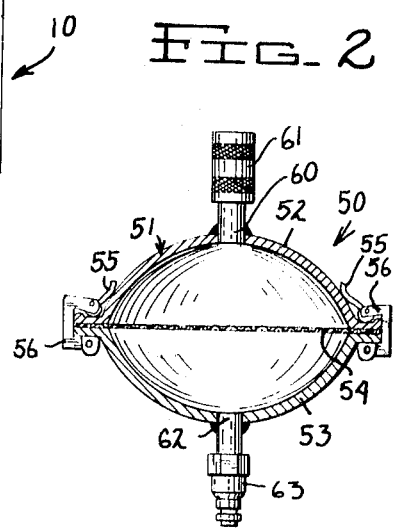
FIG. 2 is an enlarged axial sectional view of the filter.
Figure 3:
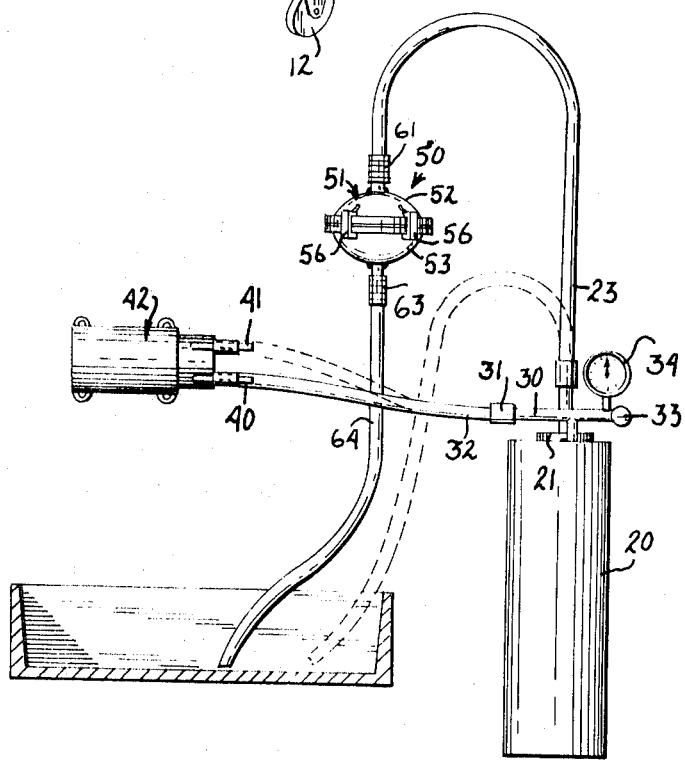
FIG. 3 is a semischematic view illustrating in full lines the connections of the conduits for replacing filtered oil into the deep-frying unit and illustrating in broken lines the connections of the conduits for removing unfiltered oil from the deep-frying unit.

Referring to the Figures, the numeral 10 generally designates a housing enclosed on four sides and the bottom and having a cover 11 engageable over the top thereof. The housing 10 has four casters 12 affixed to the underside thereof for rendering the housing 10 easily movable from a storage area to a position adjacent a deep frying unit. A shelf 13 is removably mounted approximately midway between the top and the bottom of the housing 10 and extends approximately the width and length thereof. The shelf 13 has an opening 14 therethrough adjacent one side of the housing 10 for reasons which will be explained presently. It should be understood that the housing 10 is illustrated for exemplary purposes only and a variety of housings or other containers might be designed by those skilled in the art.

An elongated cylindrical holding tank 20 is positioned within the housing 10 so as to extend through the opening 14 in an upright position. The holding tank 20 has an opening in the top thereof sufficiently large for easy cleaning of the tank 20, which opening is closable by means of a quick release pressure lid 21. The pressure lid 21 has a stand pipe 22 fixedly attached therein and extending through the lid 21 to adjacent the bottom of the holding tank 20. The upper end of the stand pipe 22 has a section of conduit 23 affixed thereto by means of a coupling 24. The coupling 24 may be of the quick connect type for quick removal of the conduit 23, if desired. The holding tank 20 should be constructed of a material acceptable to the food handling industry, such as stainless steel or the like and should have at least an eight gallon capacity with the capability of containing a pressure of plus or minus 20 pounds per square inch.

An airport is provided in the holding tank 20 by fixedly engaging a section of pipe 30 through the upper end thereof adjacent the lid 21. The pipe 30 has a T at the upper end thereof, one branch of which has a coupling 31 affixed thereto for attaching a section of conduit 32 and the other branch of which has affixed thereto a pop off relief valve 33 and a gauge 34 for indicating the amount of pressure or vacuum within the holding tank 20. The other end of the conduit 32 is adapted to be connected to an air pressure connection 40 or a vacuum connection 41 of an air pump 42, which is mounted within the housing 10 below the shelf 13. The air pump 42 may be any commercially available unit including a motor, generally of the electrical variety, and an air pump which should be capable of supplying approximately 1-½ cubic feet per minute to a maximum positive or negative of approximately 15 pounds per square inch. It should be understood that the values given herein are those utilized in the present embodiment and are for strictly exemplary purposes.

Filter means generally designated 50 includes a somewhat ellipsoidally shaped housing 51 formed of upper and lower sections 52 and 53, respectively. The upper and lower sections 52 and 53 have transversely outwardly extending flanges adjacent the edges thereof adapted to be positioned in generally parallel adjacent relationship. A generally circular or disc shaped disposable filter element 54 is engaged between the upper and lower sections 52 and 53 to maintain the filter element 54 in a taut operative position. The upper and lower sections 52 and 53 are fixedly engaged together by means of a plurality of generally C-shaped clamps 56 adapted to engage the flange of the lower section 53 and having cam acting levers 55 adapted to engage the flange of the upper section 52. By means of the cam acting levers 55 the clamps 56 maintain the upper and lower sections 52 and 53 in sealed engagement to prevent the passages of air or other fluids therebetween.

The upper section 52 of the housing 51 has a hot oil inlet 60 therein with a coupling 61 affixed thereto for engaging the free end of the conduit 23. The lower section 53 of the housing 51 has a hot oil outlet 62 therein with a coupling 63 affixed thereto, which may optionally have affixed thereto a short section of conduit 64. The coupling 61 is the quick disconnect type, for reasons which will become apparent presently, while the coupling 63 is a standard coupling for receiving conduit in communication therewith. The filter means 50 has a bracket 65 associated therewith, which is adapted to rest on the sides of a commercial type deep fry unit and mount the filter means 50 in an operative position thereabove while maintaining the coupling 63, or conduit 64 if necessary, above the normal level of the oil within the unit.

In the operation of the present filtering unit, the cover 11 is removed from the housing 10 and the first conduit 32 is connected between the coupling 31 on the tank 20 and the vacuum connection 51 of the air pump 42. One end of the conduit 23 is connected to the coupling 24 and the other end is submerged in the oil of a deep fry unit. The air pump 42 is then energized and a partial vacuum, or pressure below atmospheric, is produced in the holding tank 20, which causes oil to flow from the deep fry unit through the conduit 23 into the holding tank 20. When substantially all of the oil is removed from the deep fry unit and contained in the holding tank 20, the deep fry unit can be cleaned, repaired, or any other maintenance that is required can be performed. Since the airport is in the top of the holding tank 20 no oil flows into the air pump 42 and only relatively clean air is pumped thereby. If desired a filter may be provided in the vacuum connection 41 as added protection against the possibility of droplets of oil entering the air pump 42 therethrough.

Once the deep fry unit is ready for the return of the oil therein, the free end of the conduit 23 is engaged in the coupling 61 of the filter means 50 and the filter means 50 is positioned above the oil-holding compartment of the deep fry unit, by means of the bracket 65 or some similar device. The first conduit 32 is then disengaged from the vacuum connection 41 and engaged with the pressure connection 40 of the air pump 42. The air pump 42 is then energized to produce an air pressure within the holding tank 20 to force the oil through the stand pipe 22, conduit 23 and filter means 50 into the oil-containing compartment of the deep fry unit. If the filter means 50 cannot be conveniently positioned over the oil-containing compartment so that the oil drains directly from the coupling 63 into the compartment, the conduit 64 may be required. Once the filtered oil is returned to the oil-containing compartment of the deep fry unit the conduits 64 and 23 can be disengaged from the filter means 50. The filter means 50 can then be disassembled and the filter element 54 along with any sludge or other foreign particles are discarded. The various components, including the conduits 23, 32 and 64, are removed, the lid 21 is removed from the holding tank 20 and the entire unit is thoroughly cleaned. The various components can then be stored on the shelf 13 until needed again.

Thus, a deep fry oil-filtering unit is disclosed which is simple to manufacture and use. Further, the filtering unit is portable so that only one unit is required to clean a large plurality of deep fry units. In addition, the disclosed filtering unit is simple to maintain since there are no moving parts through which the filtered oil must pass. Because an air pump is utilized to draw oil into and force oil out of a holding tank and because no oil enters the air pump, the filtering unit is greatly simplified in both construction and operation. Further, while switching valves might be utilized to alter the flow, rather than removing the conduits and connecting them to different couplings as described, no switching valves have been included in the present embodiment to simplify the construction thereof and subsequent cleaning operations.

What is claimed is:
1. Deep fry oil-filtering unit comprising:
 a. a hot oil holding tank having a hot oil port and an airport therein;
 b. filtering means having an unfiltered hot oil inlet and a filtered hot oil outlet, said outlet having conduit means attached thereto for communicating with a deep fry unit;
 c. an air pump having a pressurized air outlet and an air inlet;
 d. first conduit means for sequentially connecting said air inlet of said air pump to said air port in said holding tank to draw air from said holding tank and produce subatmospheric pressure therein and connecting said air outlet of said air pump to said air port of said holding tank to supply pressurized air to said holding tank and produce greater than atmospheric pressure therein; and
 e. second conduit means for sequentially connecting said hot oil port of said holding tank to the deep fry unit of hot oil and to the inlet of said filtering means as said first conduit means is sequentially connected to said air inlet and said air outlet, respectively.

2. Deep fry oil-filtering unit as set forth in claim 1 wherein the filtering means includes a housing having removable portions for internal cleaning thereof.

3. Deep fry oil-filtering unit as set forth in claim 2 wherein the housing further includes means for receiving a disposable filter therein.

4. Deep fry oil-filtering unit as set forth in claim 1 wherein the second conduit means includes at least a length of flexible tubing capable of withstanding the effects of hot oil flowing therethrough.

5. Deep fry oil-filtering unit as set forth in claim 1 including in addition a portable wheeled housing having the holding tank and air pump mounted therein and additional space for storing the removing portions of the filtering unit.

6. A method of filtering cooking oil from a deep fry unit comprising the steps of:
 a. supplying a holding tank having an oil port and an air port, a filter, an air pump having pressure and vacuum connections and sections of tubing;
 b. connecting a first section of tubing between the holding tank air port and vacuum connection of the pump and connecting a second section of tubing between the holding tank oil port and the oil in a deep fry unit;
 c. operating the air pump until substantially all of the oil is removed from the deep fry unit and contained in the holding tank;
 d. disconnecting the first section of tubing from the vacuum connection and connecting it to the pressure connection of the air pump, disconnecting the second section of tubing from the deep fry unit and connecting it to the filter, and causing oil flowing through the filter to flow into the deep fry unit; and
 e. operating the air pump until substantially all of the oil is forced out of the holding tank, through the filter and into the deep fry unit.